United States Patent
Nakajima et al.

(10) Patent No.: US 9,020,750 B2
(45) Date of Patent: Apr. 28, 2015

(54) DRIVE ASSIST DEVICE, AND VEHICLE USING DRIVE ASSIST DEVICE

(71) Applicants: Mitsuru Nakajima, Kanagawa (JP); Shuichi Suzuki, Kanagawa (JP); Motoyasu Murai, Tokyo (JP)

(72) Inventors: Mitsuru Nakajima, Kanagawa (JP); Shuichi Suzuki, Kanagawa (JP); Motoyasu Murai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/288,537

(22) Filed: May 28, 2014

(65) Prior Publication Data

US 2014/0358418 A1 Dec. 4, 2014

(30) Foreign Application Priority Data

May 30, 2013 (JP) ................. 2013-113733

(51) Int. Cl.
*G01S 13/08* (2006.01)
*G08G 1/16* (2006.01)
(Continued)

(52) U.S. Cl.
CPC .......... *G08G 1/16* (2013.01); *G01S 13/867* (2013.01); *G06K 9/00805* (2013.01); *G01S 17/88* (2013.01); *G01C 3/08* (2013.01); *G01S 17/06* (2013.01); *G01S 17/08* (2013.01); *G01S 17/42* (2013.01); *G06K 9/00798* (2013.01); *G06T 2207/10028* (2013.01); *G06T 7/004* (2013.01);
(Continued)

(58) Field of Classification Search
CPC ......... G08G 1/16; G01S 17/88; G01S 17/936; G01S 13/867; G01S 17/06; G01S 17/08; G01S 17/42; G06K 9/00798; G06K 9/00805; G01C 3/08; B60W 2050/0075; B60W 2550/10; B60W 2550/30; B60W 2550/308; B60W 30/09; B60W 30/08; B60W 30/16; G06T 2207/10028; G06T 2207/30261; G06T 7/004; B60T 2201/022; B60R 2300/8093; B60Q 9/008

USPC ............ 701/36, 45, 70, 96, 300, 301; 342/70, 342/71; 340/901; 356/124; 382/103, 106

See application file for complete search history.

(56) References Cited

U.S. PATENT DOCUMENTS 743,372 A * 11/1903 Bachelet .................. 600/13
5,204,489 A * 4/1993 Pellarin et al. ............ 89/41.19
(Continued)

FOREIGN PATENT DOCUMENTS

DE 103 31 074 A1 2/2005
DE 10 2009 060 392 A1 6/2011
(Continued)

OTHER PUBLICATIONS

Continental Corporation, "Continental Integrates the Camera and Infrared Functions into a Single Compact Unit", Oct. 17, 2012, Continental Corporation, 3 pages.
(Continued)

*Primary Examiner* — Russell Frejd
(74) *Attorney, Agent, or Firm* — Oblon, McClelland, Maier & Neustadt, L.L.P.

(57) ABSTRACT

A drive assist device includes a light source that irradiates a detection target with light, a first lens having a first area through which the irradiated light from the light source passes, a second lens having a second area through which reflected light reflected from the detection target passes, and a light receiving element that receives the reflected light that passes the second lens. The first area and the second area are arranged to be in align with each other, in width direction of the drive assist device.

9 Claims, 8 Drawing Sheets

(51) Int. Cl.
*G06K 9/00* (2006.01)
*G01S 17/88* (2006.01)
*G01C 3/08* (2006.01)
*G01S 17/06* (2006.01)
*G01S 17/08* (2006.01)
*G01S 17/42* (2006.01)
*G06T 7/00* (2006.01)
*B60W 30/16* (2012.01)
*B60W 30/08* (2012.01)
*B60W 30/09* (2012.01)
*B60R 11/04* (2006.01)
*G01S 17/02* (2006.01)
*G01S 17/93* (2006.01)
*G01S 7/481* (2006.01)
*G01S 7/48* (2006.01)
*G01S 13/86* (2006.01)
*B60Q 9/00* (2006.01)
*B60W 50/00* (2006.01)
*G01S 13/93* (2006.01)

(52) U.S. Cl.
CPC ......... *B60R 2300/8093* (2013.01); *B60Q 9/008* (2013.01); *B60W 2050/0075* (2013.01); *B60W 30/16* (2013.01); *B60W 30/08* (2013.01); *B60W 30/09* (2013.01); *B60W 2550/30* (2013.01); *B60T 2201/022* (2013.01); *B60W 2550/10* (2013.01); *G06T 2207/30261* (2013.01); *B60W 2550/308* (2013.01); *B60R 11/04* (2013.01); *G01S 17/023* (2013.01); *G01S 17/936* (2013.01); *G01S 7/4813* (2013.01); *G01S 2013/9392* (2013.01); *G01S 7/4802* (2013.01)

(56) References Cited

U.S. PATENT DOCUMENTS

| | | | |
|---|---|---|---|
| 6,476,731 B1 * | 11/2002 | Miki et al. | 340/937 |
| 7,656,508 B2 * | 2/2010 | Iwaki et al. | 356/4.03 |
| 7,675,455 B2 * | 3/2010 | Hatono | 342/33 |
| 8,204,678 B2 * | 6/2012 | Matsuno | 701/300 |
| 8,423,242 B2 * | 4/2013 | Ochiai et al. | 701/36 |
| 2005/0156102 A1 | 7/2005 | Hagleitner et al. | |
| 2011/0181407 A1 | 7/2011 | Kole | |
| 2012/0001769 A1 * | 1/2012 | Nitanda et al. | 340/901 |
| 2012/0081544 A1 * | 4/2012 | Wee | 348/140 |
| 2013/0038857 A1 * | 2/2013 | Funayama et al. | 356/4.07 |
| 2013/0077083 A1 | 3/2013 | Suzuki et al. | |
| 2013/0120578 A1 * | 5/2013 | Iga et al. | 348/148 |
| 2013/0120734 A1 | 5/2013 | Ogata et al. | |
| 2013/0229645 A1 | 9/2013 | Suzuki et al. | |
| 2014/0002878 A1 | 1/2014 | Hayashi et al. | |
| 2014/0003062 A1 | 1/2014 | Yoshimura et al. | |
| 2014/0009747 A1 | 1/2014 | Suzuki et al. | |
| 2014/0034817 A1 | 2/2014 | Nakamura et al. | |
| 2014/0071428 A1 | 3/2014 | Suzuki et al. | |

FOREIGN PATENT DOCUMENTS

| | | |
|---|---|---|
| EP | 2 680 030 A1 | 1/2014 |
| EP | 2 680 031 A1 | 1/2014 |
| EP | 2 687 865 A1 | 1/2014 |
| JP | 9-189767 | 7/1997 |
| JP | 2001-318148 | 11/2001 |
| JP | 2013-083626 | 5/2013 |
| JP | 2013-170962 | 9/2013 |
| JP | 2014-006476 | 1/2014 |
| JP | 2014-010193 | 1/2014 |
| JP | 2014-020889 | 2/2014 |
| JP | 2014-029316 | 2/2014 |
| JP | 2014-029317 | 2/2014 |
| JP | 2014-029318 | 2/2014 |
| JP | 2014-032149 | 2/2014 |
| JP | 2014-055860 | 3/2014 |

OTHER PUBLICATIONS

The Extended European Search Report issued Sep. 15, 2014, in Application No. / Patent No. 14169605.4-1811.

* cited by examiner

DRIVE ASSIST DEVICE, AND VEHICLE USING DRIVE ASSIST DEVICE

CROSS-REFERENCE TO RELATED APPLICATIONS

This patent application is based on and claims priority pursuant to 35 U.S.C. §119 to Japanese Patent Application No. 2013-113733, filed on May 30, 2013, in the Japan Patent Office, the entire disclosure of which is hereby incorporated by reference herein.

BACKGROUND

1. Technical Field

The present invention generally relates to a drive assist device that assists driving of the vehicle, and the vehicle provided with the drive assist device.

2. Description of the Related Art

The recent vehicles may be provided with active safety systems, which detect surroundings of the vehicle in vehicle traveling direction, and control operation of the vehicle based on detection information. For example, the active safety systems are usually provided with a drive assist device having an image capturing device and/or a radar. The drive assist device detects a detection target, such as an object, a lane, or a vehicle ahead, and calculates a distance to the detection target. Based on the detection information such as the calculated distance, the active safety systems control operation of the vehicle. For example, the active safety systems may automatically stop the vehicle to avoid collision with the detected object or warn a driver by displaying an image of the detected object, control steering to keep the vehicle to drive along the lane, or control driving of the vehicle to follow a vehicle ahead of the vehicle.

SUMMARY

Example embodiments of the present invention include a drive assist device including: a light source that irradiates a detection target with light; a first lens having a first area through which the irradiated light from the light source passes; a second lens having a second area through which reflected light reflected from the detection target passes; and a light receiving element that receives the reflected light that passes the second lens. The first area and the second area are arranged to be in align with each other, in width direction of the drive assist device. The width direction corresponds to a vehicle width direction, when the drive assist device is installed onto the vehicle.

Example embodiments of the present invention include a vehicle including the drive assist device that obtains detection information indicating surroundings of the vehicle in vehicle traveling direction, and a vehicle controller that controls operation of the vehicle based on the detection information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
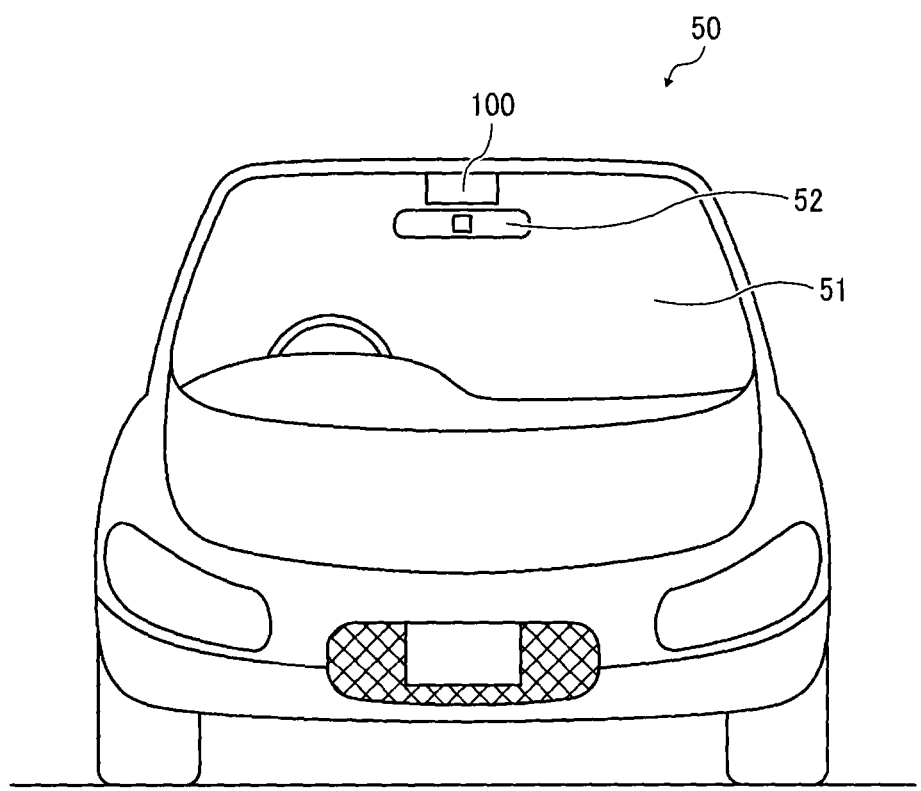
FIG. 1 is an illustration of a vehicle when viewed from a front of the vehicle, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring to the drawings, a drive assist device and a vehicle provided with the drive assist device are explained according to example embodiments of the present invention.

FIG. 1 is a front view illustrating a vehicle 50 according to an example embodiment of the present invention. As illustrated in FIG. 1, the vehicle 50 includes a drive assist device 100, which is provided near an inner rear view mirror 52 that is located at an upper portion of the inner side surface (that is, inside the vehicle) of a front glass 51. The location where the drive assist device 100 is provided is not limited to this example illustrated in FIG. 1, such that the location could be anywhere inside the vehicle such as the location above a dashboard, or the outside surface of the vehicle, as long as the drive assist device 100 is capable of detecting an object in surroundings of the vehicle in travelling direction. Further, the drive assist device 100 may be freely installed onto any desired portion of the vehicle 50.

In FIG. 1, the width direction of the vehicle 50 (the right and left direction on the sheet surface) is referred to as a vehicle-width direction, and the direction orthogonal to the sheet surface is referred to as a vehicle traveling direction.

The vehicle 50 includes a vehicle controller 61 that controls various devices of the vehicle 50, such that it may function as a power controller, a brake controller, a steering force controller, and a display controller, etc. The vehicle controller 61 controls various devices in the vehicle 50 based on detection information detected by the drive assist device 100, to assist the vehicle 50 to safely travel. In other words, the vehicle controller 61 operates as the active safety systems. More specifically, the vehicle controller 61 includes a processor such as a central processing unit (CPU), and a memory such as a volatile memory or a non-volatile memory. In operation, the processor loads a drive control program that is stored in the non-volatile memory onto the volatile memory to perform active safety operation. Examples of the detection information include, but not limited to, information indicating whether a target for detection is present or not, information indicating a distance or direction to the detection target, or information indicating characteristics of the detection target such as the size of the detection target.

In this example, it is assumed that the drive assist device 100 has an image capturing device and a laser, which are integrated.

For example, the drive assist device 100 emits laser light to the detection target, receives reflection light reflected from the detection target, and counts a time period from the time at which the light is irradiated to the time at which the light is received, to obtain a distance to the detection target.

Further, the drive assist device 100 may capture an image of surroundings of the vehicle in the vehicle traveling direction to generate a captured image. The vehicle controller 61 of the vehicle 50 detects the detection target in the captured image, using any desired image recognition technique.

Based on the detected distance to the detection target, and/or information regarding the detection target that is obtainable from the captured image, the drive controller 61 performs active safety operation.

When the distance to the detection target is within a predetermined range, the vehicle controller 61 of the vehicle 50 reduces the speed of the vehicle 50 or stops the vehicle 50, for example, by controlling a throttle actuator 63 or a brake actuator 64 based on the current vehicle speed that is detected by a sensor 62. Alternatively, the vehicle controller 61 may warn a driver using the sound or image. For example, the vehicle controller 61 causes a display 65 to display a warning message or an image of the detection target. The display 65 is preferably provided at a location where a driver can easily see while driving.

Further, the drive assist device 100 may determine whether the detection target is a vehicle or a human using the captured image, and controls activity safety operation depends on characteristics of the detection target as well as information indicating the detected distance to the detection target. For example, when the human or any other object that is not moving is detected, the drive assist device 100 controls various devices in the vehicle 50 to immediately stop driving of the vehicle 50 to prevent the vehicle 50 from colliding with the detection target. In another example, when the vehicle is detected, the drive assist device 100 controls various devices in the vehicle 50 to keep driving the vehicle 50 while maintaining a certain distance to the detected vehicle. In another example, the vehicle controller 61 detects the location of a white lane on the road, or the edge of the road surface, using the captured image to prevent the vehicle from straying away from the lane.

Figure 2:
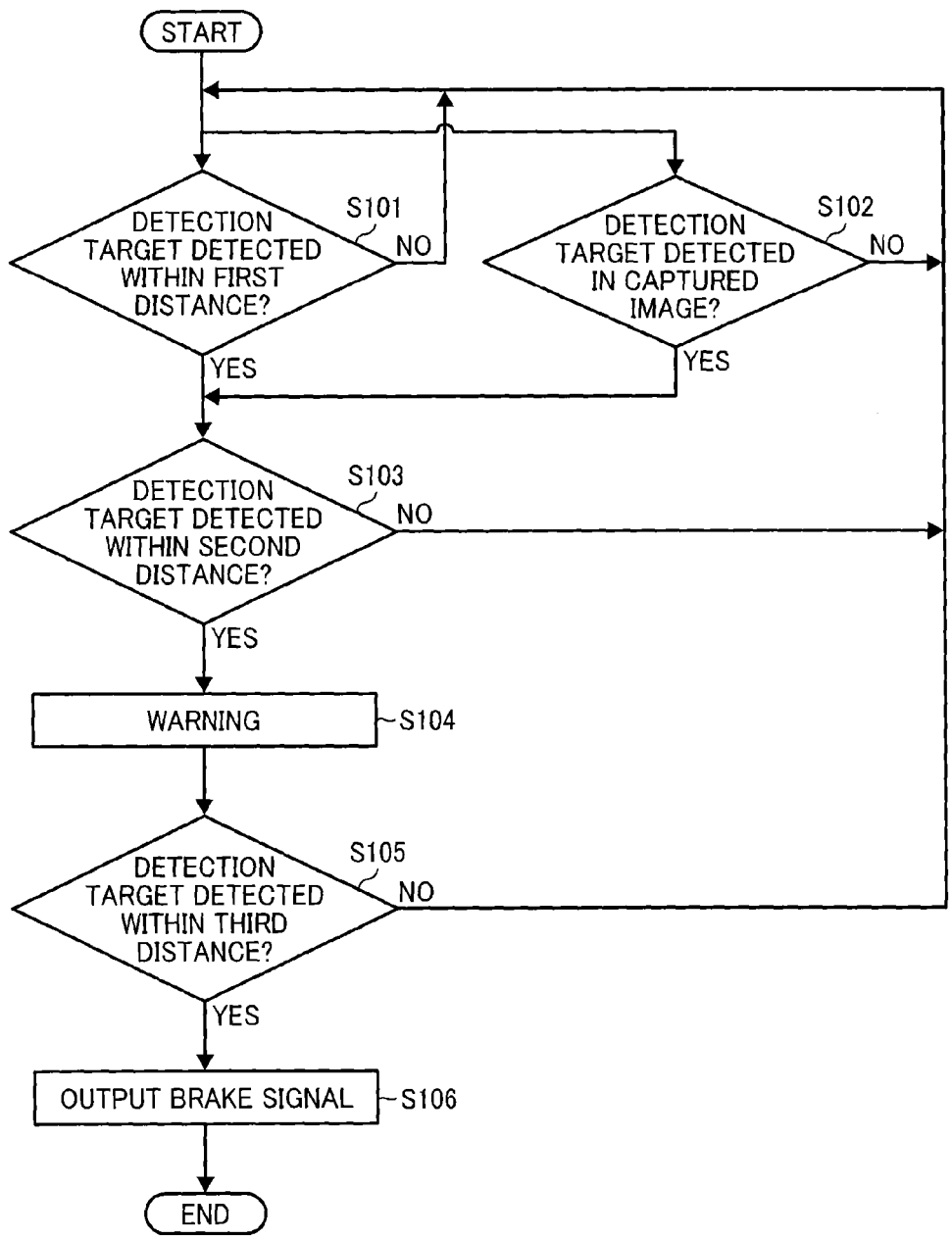
FIG. 2 is a flowchart illustrating operation of controlling activity safety operation, performed by a vehicle controller of the vehicle of FIG. 1, according to an example embodiment of the present invention.

FIG. 2 is a flowchart illustrating operation of controlling activity safety operation, performed by the vehicle controller 61 of the vehicle 50.

At S101, the vehicle controller 61 of the vehicle 50 determines whether the detection target is present within a first predetermined distance, based on the detected distance to the detection target obtained by the drive assist device 100. For example, the drive assist device 100 may determine if there is any detection target within the first distance based on the detection result of a laser rader. When it is determined that there is no detection target within the first distance ("NO" at S101), the operation repeats S101.

At S102, the vehicle controller 61 of the vehicle 50 determines whether a detection target having a size that is equal to or greater than a predetermined size is present in the captured image captured by a camera of the vehicle assist device 100, specifically, the scenery in the road ahead in the traveling direction. When it is determined that the determination result is "NO" ("NO" at S102), the operation repeats S102.

In this example, S101 and S102 may be performed in any other, or concurrently. It is, however, preferable to perform S101 and S102 concurrently to improve accuracy in detection.

When at least one of the determination results obtained at S101 and S102 is "YES", the operation proceeds to S103. When none of the determination results obtained at S101 and S102 is "YES", the operation repeats S101 or S102.

At S103, the vehicle controller 61 of the vehicle 50 determines whether the detection target is present within a second predetermined distance, based on the detected distance to the detection target obtained by the drive assist device 100. The second predetermine distance is set shorter than the first predetermined distance.

When it is determined that the detection target is present within the second predetermined distance ("YES" at S103), the operation proceeds to S104. When it is determined that the detection target is not present within the second distance ("NO" at S103), the operation returns to S101 or S102. At S104, the vehicle controller 61 gives warning to a driver of the vehicle 50, for example, by outputting sound or an image indicating that the detection target is close to the vehicle 50.

At S105, the vehicle controller 61 determines whether the detection target is present within a third predetermined distance, based on the detected distance to the detection target obtained by the drive assist device 100. The third predetermined distance is set shorter than the second predetermined distance.

When it is determined that the detection target is present within the third predetermined distance ("YES" at S105), the operation proceeds to S106. When it is determined that the detection target is not present within the third distance ("NO" at S105), the operation returns to S101 or S102. At S106, the vehicle controller 61 outputs a brake signal of the vehicle 50 to the brake actuator 64 of the vehicle 50. The brake actuator 64 of the vehicle 50, which receives the brake signal, slows down and stops the vehicle 50, and the operation ends.

Referring now to FIGS. 3 to 8, the drive assist device 100 is explained according to an example embodiment of the present invention.

Figure 3:
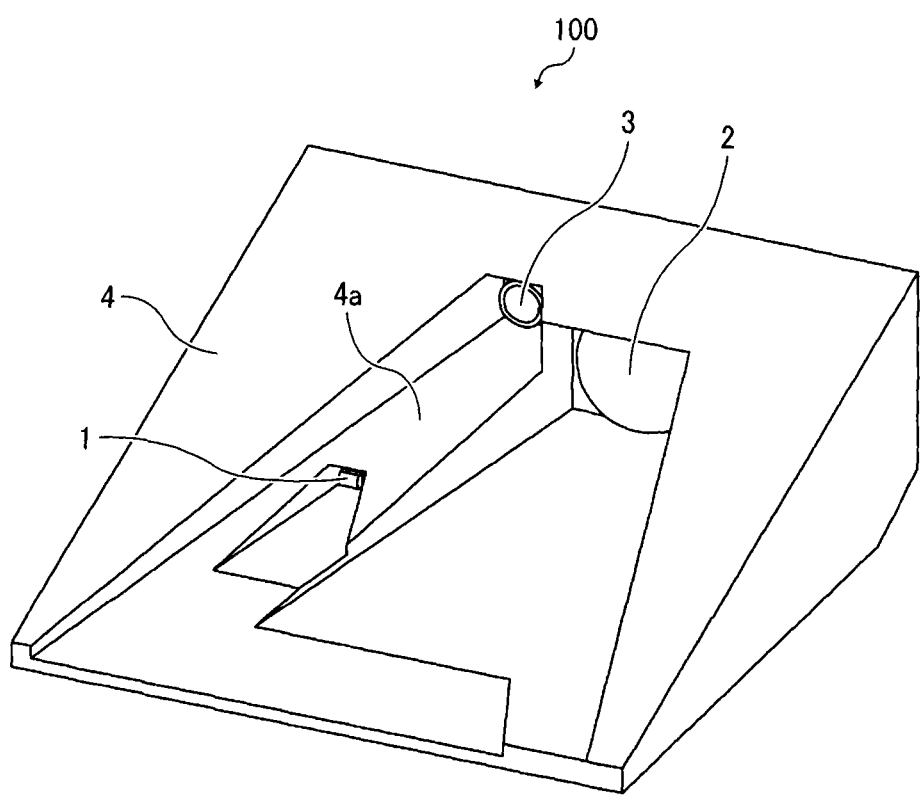
FIG. 3 is a perspective view illustrating a drive assist device provided in the vehicle of FIG. 1, according to an example embodiment of the present invention.

FIG. 3 is a perspective view illustrating a configuration of the drive assist device 100. The drive assist device 100 includes a light source lens 1, a receive light lens 2, and a camera lens 3, which are incorporated in a case 4.

Figure 4:
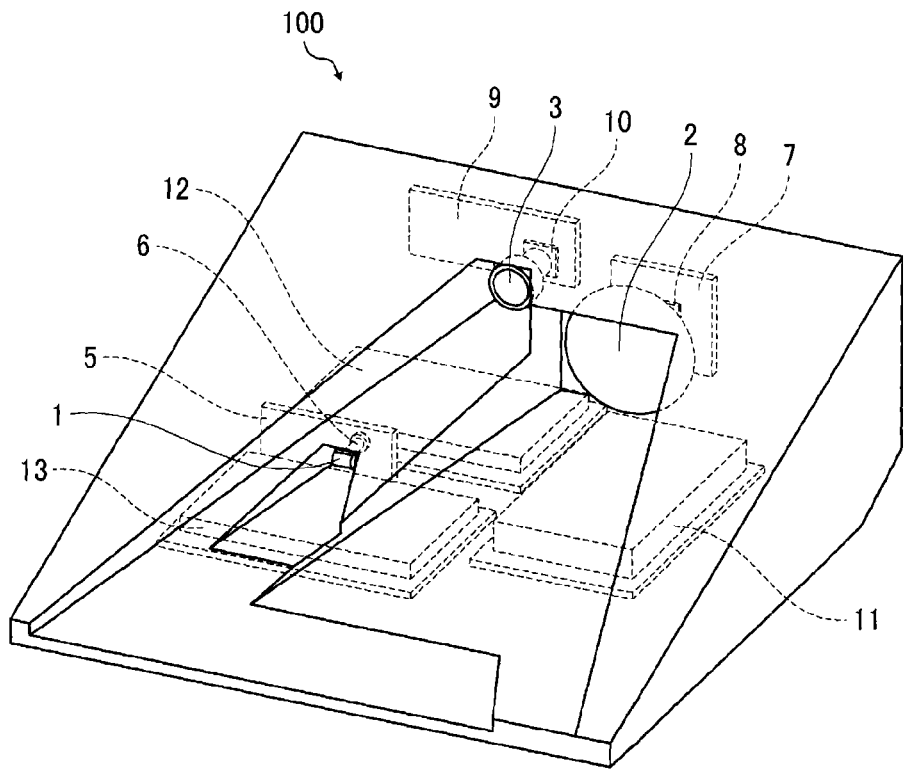
FIG. 4 is a perspective view illustrating the inner side of the drive assist device of FIG. 3.

FIG. 4 is a perspective view illustrating the inside of the drive assist device 100. The drive assist device 100 includes, in the inside of the case 4, a light source mount board 5, a light source 6, a light receiving element mount board 7, a light receiving element 8, an image capturing element mount board 9, an image capturing element 10, a laser radar drive circuit 11, a first image processing circuit 12, and a second image processing circuit 13.

The light source lens 1 is one example of a first lens, which receives the light emitted from the light source 6. As the irradiated light passes through the light source lens 1, a direction or an angle of the irradiated light is changed according to characteristics of the light source lens 1.

The light receiving lens 2 is one example of a second lens, which receives the light reflected from the detection target. As the reflected light passes through the light receiving lens 2, a direction or an angle of the reflected light is changed according to characteristics of the light receiving lens 2.

The camera lens 3 is one example of a third lens, which receives the object light from the detection target. As the object light passes through the camera lens 3, a direction or an angle of the light is changed according to characteristics of the camera lens 3.

The case 4 defines an outline of the drive assist device 100. In the case 4, the drive assist device 100 includes a shield 4a having a surface that separates a light path of the irradiated light for the light source lens 1 and a light path of the reflected light for the light receiving lens 2, and a surface that separates the light path of the irradiated light for the light source lens 1 and a light path of the object light for the camera lens 3. With the shield 1a, in the drive assist device 100, the irradiated light emitted from the light source 6 is prevented from entering into the light receiving element 8 or the image capturing element 10, either directly or after being reflected by the front glass 51.

The light source mount board 5 has the light source 6 mounted thereon, and a light source control circuit that controls operation of the light source 6. The light source mount board 5 raises an oscillating signal of the light source 6. More specifically, the light source control circuit raises a voltage supplied from the vehicle 50 to a predetermined voltage, and generates an oscillating signal that causes the light source 6 to irradiate light.

The light source 6 irradiates the detection target with light. The light source 6 may be implemented by a laser diode, for example, to emit light.

The light receiving element mount board 7 has the light receiving element 8 mounted thereon, and a light receiving element control circuit that controls operation of the light receiving element 8. The light receiving element control circuit controls the power of the received signal, such that it may increase or reduce the power of the signal converted from the reflected light received at the light receiving element 8. The light receiving element control circuit further counts a time period, from the time at which the laser radar drive circuit 11 generates the signal, to the time at which a signal converted from the reflected light is generated. Using the time period counted by the light receiving element control circuit, the vehicle controller 61 calculates the distance to the detection target.

The light receiving element 8 receives the reflected light that passes through the light receiving lens (second lens) 2, converts the reflected light to an electric signal, and transmits the signal to the vehicle controller 61. The light receiving element 8 may be implemented by a photodiode such as Avalanche Photo Diode (APD).

The image capturing element mount board 9 includes the image capturing element 10 mounted thereon, and an image capturing element control circuit that controls operation of the image capturing element 10.

The image capturing element 10 receives the object light from the detection target through the camera lens 3 to capture an image. The image capturing element 10 may be implemented by a complementary MOS (CMOS) or a charged coupled device (CCD).

Based on the captured image obtained by the image capturing element 10, the vehicle controller 61 determines whether the detection target in the captured image is a human, vehicle, or lane. In this example, the captured image may be one image or a plurality of images.

The light source mount board 5 having the light source control circuit, and the light receiving element mount board 7 having the light receiving element control circuit are provided in the drive assist device 100, such that they are electrically shielded from each other. With this configuration, the light receiving element 8 is prevented from receiving the irradiated light emitted from the light source 6, thus improving the detection accuracy while achieving reduction in size of the drive assist device 100.

The light source mount board 5 having the light source control circuit, and the image capturing element mount board 9 having the image capturing control circuit are provided in the drive assist device 100, such that they are electrically shielded from each other. With this configuration, the image capturing element 10 is prevented from receiving the irradiated light emitted from the light source 6, thus improving the captured image quality while achieving reduction in size of the drive assist device 100.

The laser radar drive circuit 11 generates an oscillating signal, which drives the light source 6 to emit laser light. The laser radar drive circuit 11 includes an oscillator, which causes the light source 6 to emit light at predetermined time. The laser radar drive circuit 11 transmits the oscillating signal to the light source mount board 5. The laser radar drive circuit 11 counts a time period from the time at which the laser radar drive circuit 11 generates the oscillating signal to the time at which the reflected light is received at the light receiving element 8, to obtain the time period used for calculating the distance to the detection target.

The first image processing circuit 12 and the second image processing circuit 13 are each provided with the function of image processing. For example, the first image processing circuit 12 and the second image processing circuit 13 convert image data obtainable from the captured image captured by the image capturing element 10, in a format that can be interpreted by the vehicle controller 61, and sends the converted image data to the vehicle controller 61. The first image processing circuit 12 and the second image processing circuit 13 may be implemented by a single image processing circuit.

The detected distance, which is obtained by the laser radar drive circuit 11, is input to the first image processing circuit 12 and the second image processing circuit 13, respectively. Using the detected distance, which is one example of detection information indicating the surroundings of the vehicle 50, the vehicle controller 61 may generate warning or a brake signal as described above referring to FIG. 2.

Figure 5:
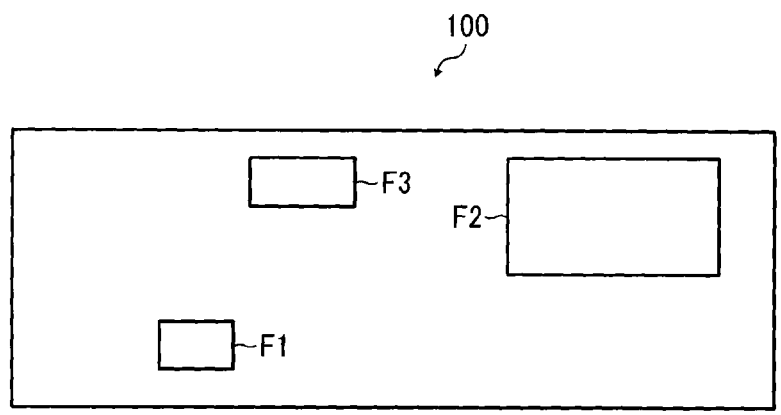
FIG. 5 is a front side view illustrating an outer surface of the drive assist device of FIG. 3.

Referring to FIG. 5, the arrangement of the light source lens 1, the light receiving lens 2, and the camera lens 3 is explained according to an example embodiment of the present invention.

In FIG. 5, F1 denotes a first lens surface area of the light source lens 1 through which the irradiated light emitted from the light source 6 passes. F2 denotes a second lens surface area of the light receiving lens 2 through which the reflected light received at the light receiving element 8 passes. The first lens area F1 and the second lens area F2 are arranged to be in align in vehicle width direction. More specifically, the first lens area F1 and the second lens area F2 are arranged at different locations in vehicle width direction.

Still referring to FIG. 5, F3 denotes a third lens surface area of the camera lens 3 through which the object light received at the image capturing element 10 passes. The third lens area F3 is arranged to be in align with the first lens area F1 in vehicle width direction.

The first lens area F1 and the second lens area F2 are arranged such that they are not overlapped with each other on a front side plane of the drive assist device 100, that is, a front side plane of the vehicle 100.

Figure 6:
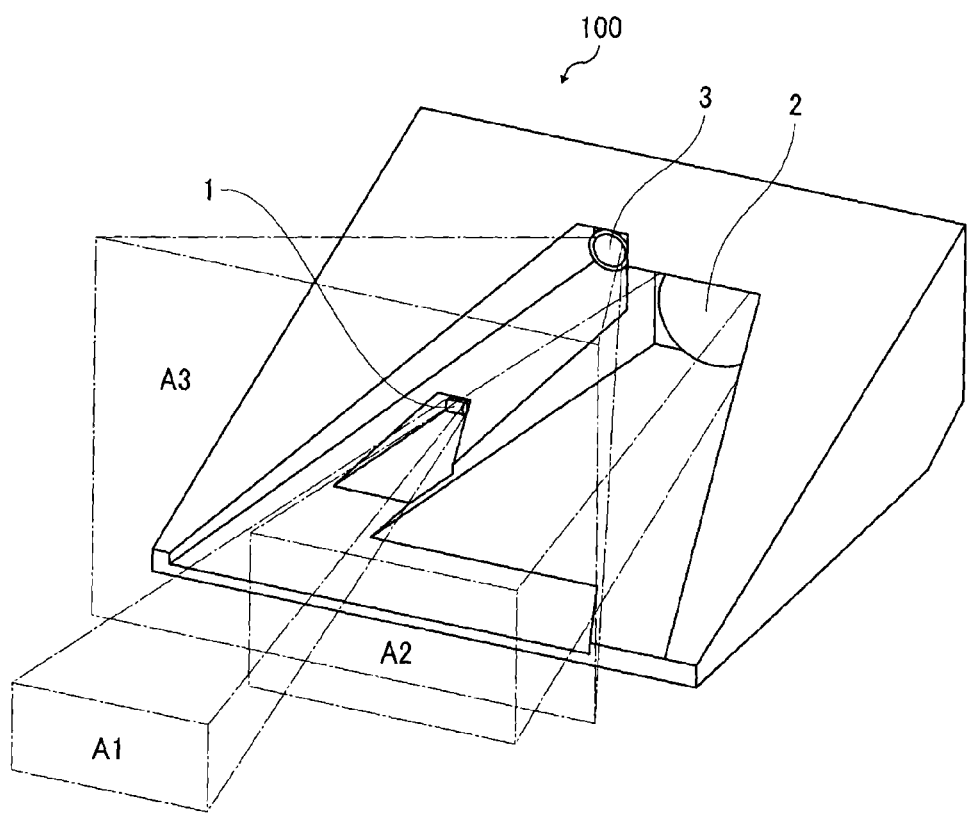
FIG. 6 is an illustration for explaining a first area, second area, and third area.

FIG. 6 illustrates the positional relationship of a first area, second area, and third area in the drive assist device 100. In FIG. 1, A1 denotes a range through which the irradiated light from the first lens area F1 of the first lens 1 passes. A2 denotes a range of area through which the reflected light to the second lens area F2 of the second lens 2 passes. A3 denotes a range of area through which the object light to the third lens area F3 of the third lens 3 passes.

As the first lens area F1 and the second lens area F2 are arranged so as to be in align with each other in vehicle width direction, the overall size of the drive assist device 100 can be reduced, while increasing the detection range of the light receiving element 8 that corresponds to the second area A2.

With the increase in area of the light receiving lens 2 that receives the object light, the efficiency in receiving light increases such that a distance that can be detected by the drive assist device 100 increases. As the distance that can be detectable by the laser increases, the detection target can be detected more quickly, thus improving safety. However, the increase in size of the light receiving lens 2 may result in increased overall size of the drive assist device 100. Especially if the height of the drive assist device 100 increases, the drive assist device 100 may narrow an area that can be viewed by the driver as the drive assist device 100 is usually provided near the inner rear view mirror 52.

While it may be technically possible to increase the intensity of the irradiated light, that is, the laser, the intensity of the laser should be kept within a certain range as specified by the standards such as IEC60825-1 (JIS C 6802-1:2005).

In view of this, the light receiving lens 2 and the light source lens 3 are not arranged in direction perpendicular to the vehicle width direction.

More specifically, the height of the drive assist device 100, that is the vertical direction of the sheet surface in FIG. 1, is made smaller. With this configuration, the overall size of the drive assist device 100 is made small, while increasing the detection capability of the drive assist device 100.

Further, in the drive assist device 100, the first lens area F1 and the third lens area F3 are arranged to be in line with each other in vehicle width direction. As described above in case of the second lens area F2, with this configuration, the overall size of the drive assist device 100 is made smaller, while increasing the detection range of the image capturing element 10 that corresponds to the third area A2.

Figure 7:
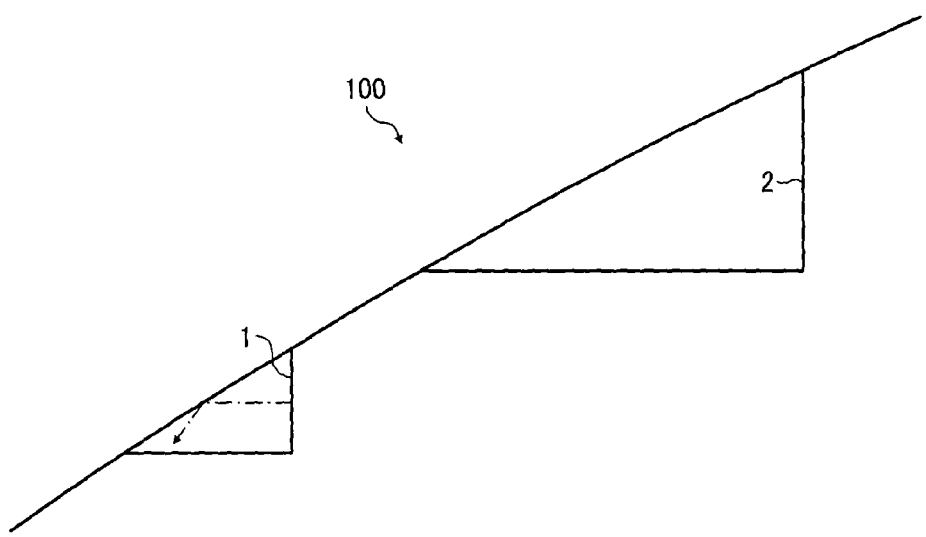
FIG. 7 is a cross-sectional view illustrating a side surface of the drive assist device of FIG. 3 for explaining the positional relationship between a light source lens and a light receiving lens in vehicle traveling direction.

FIG. 7 illustrates the positional relationship between the light source lens 2 and the light receiving lens 2 in vehicle traveling direction. In the drive assist device 100, the light source lens 1 is arranged at a front portion in vehicle traveling direction (the left direction of the sheet surface). That is, the first lens area F1 is arranged at a front portion in vehicle traveling direction than the second lens area F2.

With this configuration, the irradiated light from the light source 6 is prevented from entering into the light receiving element 8, directly or after being reflected at the front glass 51. Accordingly, the operational error may be suppressed, while achieving the smaller device size.

Figure 8:
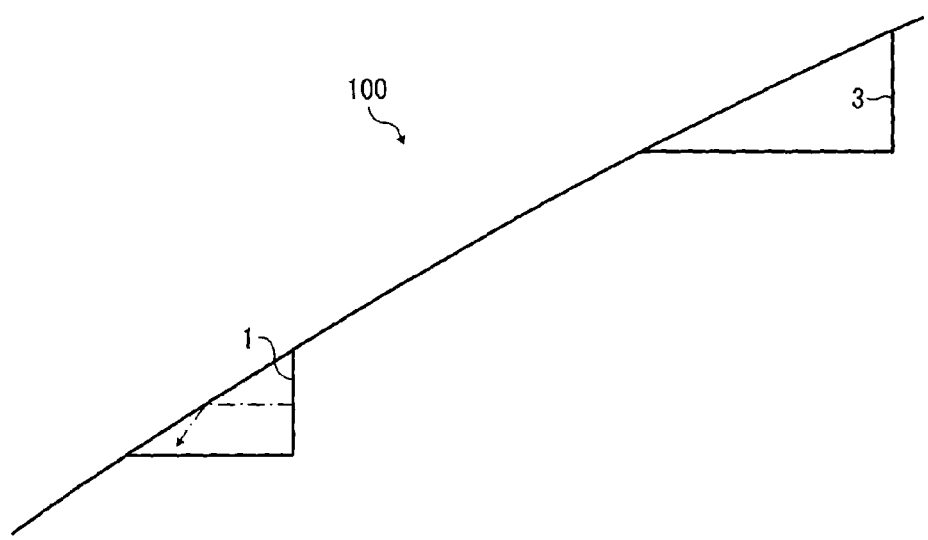
FIG. 8 is a cross-sectional view illustrating a side surface of the drive assist device of FIG. 3 for explaining the positional relationship between the light source lens and a camera lens in vehicle traveling direction.

FIG. 8 illustrates the positional relationship between the light source lens 2 and the camera lens 3 in vehicle traveling direction. In the drive assist device 100, the light source lens 1 is arranged at a front portion in vehicle traveling direction (the left direction of the sheet surface). That is, the first lens area F1 is arranged at a front portion in vehicle traveling direction than the third lens area F3.

With this configuration, the irradiated light from the light source 6 is prevented from entering into the image capturing element 10, directly or after being reflected at the front glass 51. Accordingly, the operation error may be suppressed, while achieving the smaller device size.

Figure 9:
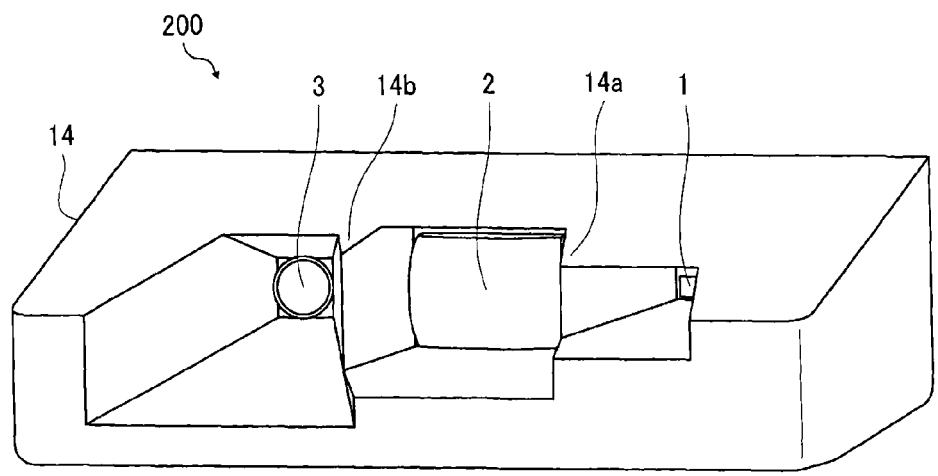
FIG. 9 is a perspective view illustrating a drive assist device provided in the vehicle of FIG. 1, according to an embodiment of the present invention.
Figure 10:
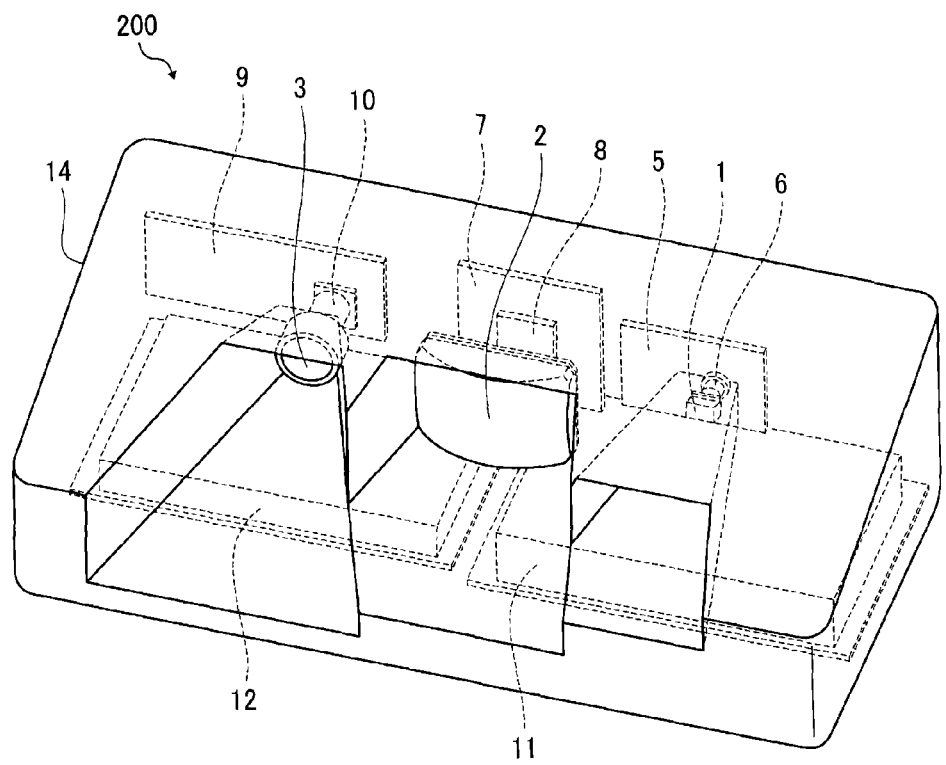
FIG. 10 is a perspective view illustrating the inner side of the drive assist device of FIG. 9.
Figure 11:
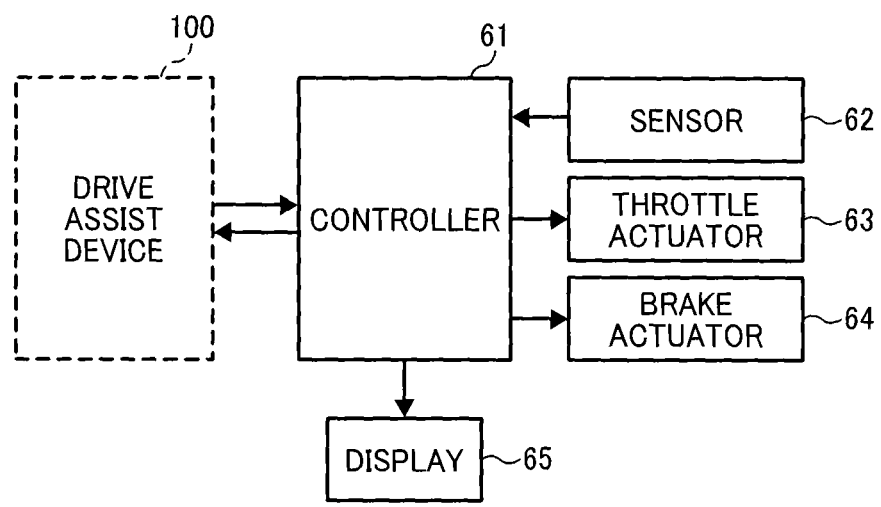
FIG. 11 is a schematic block diagram illustrating a vehicle controller and devices to be controlled by the vehicle controller in the vehicle of FIG. 1, according to an example embodiment of the present invention.

Referring now to FIGS. 9 and 10, a drive assist device 200 is explained according to an example embodiment of the present invention.

FIG. 9 is a perspective view illustrating a configuration of the drive assist device 200. FIG. 10 is a perspective view illustrating the inside of the drive assist device 200 of FIG. 9. As illustrated in FIGS. 9 and 10, the drive assist device 200 are substantially similar in structure and function to the drive assist device 100 of FIGS. 3 and 4, except for some differences. The differences include, but not limited to, the arrangement of the first lens area F1 of the light source lens 1 and the second lens area F2 of the light receiving lens 2. More specifically, the first lens area F1 and the second lens area F2 are arranged along the same plane in vehicle traveling direction.

The differences further include the arrangement of the third lens area F3 of the camera lens 3 with respect to the first lens area F1. More specifically, the third lens area F3 and the first lens area F1 are arranged along the same plane in vehicle traveling direction. The third lens area F3 is an area through which the object light received at the image capturing element 10 passes.

The drive assist device 200 includes a case 14, which includes the light source lens 1, the light receiving lens 2, and the camera lens 3, which are arranged as described above. The case 14 further includes a shield 14a arranged between the light source lens 1 and the light receiving lens 2, and a shield 14b arranged between the light source lens 1 and the camera lens 3. The shield 14a prevents the irradiated light from the light source 6 from entering into the light receiving element 8, either directly or after being reflected at the front glass 51. The shield 14b prevents the irradiated light from the light source 6 from entering into the image capturing element 10, either directly or after being reflected at the front glass 51.

As described above, with this configuration, the height (vertical direction) of the drive assist device 200 can be made smaller. Accordingly, even when the drive assist device 200 is provided near the inner rear view mirror 52 or above the dashboard, the smaller-size drive assist device 200 can ensure a wide visual field from a driver.

With some embodiments of the present invention having thus been described, it will be obvious that the same may be varied in many ways. Such variations are not to be regarded as a departure from the spirit and scope of the present invention, and all such modifications are intended to be included within the scope of the present invention. For example, elements and/or features of different illustrative embodiments may be combined with each other and/or substituted for each other within the scope of this disclosure and appended claims.

What is claimed is:

1. A drive assist device to be installed on a vehicle, the device comprising:
   a light source that irradiates a detection target with light;
   a first lens having a first area through which the irradiated light from the light source passes;
   a second lens having a second area through which reflected light reflected from the detection target passes; and
   a light receiving element that receives the reflected light that passes the second lens,
   wherein the first area and the second area are arranged at different locations from each other in a vehicle width direction,
   wherein the first area is located closer to a front portion of the drive assist device in vehicle traveling direction than the second area, and
   wherein the first area is located closer to a bottom of the drive assist device in a vehicle height direction than the second area.

2. The drive assist device of claim 1, further comprising:
   an image capturing element that receives object light from the detection target to capture an image of the detection target; and
   a third lens having a third area through which the object light to be received at the image capturing element passes,
   wherein the third area is arranged to be in align with the first lens in vehicle width direction.

3. The drive assist device of claim 1, wherein the first area and the second area are arranged at different positions in vehicle width direction.

4. The drive assist device of claim 2, wherein the first area is located closer to a front portion of the drive assist device in vehicle traveling direction than the third area.

5. The drive assist device of claim 1, further comprising:
   a light source control circuit that controls the light source; and
   a light receiving element control circuit that controls the light receiving element,
   wherein the light source control circuit and the light receiving element control circuit are electrically shielded from each other.

6. The drive assist device of claim 2, further comprising:
   a light source control circuit that controls the light source; and
   an image capturing element control circuit that controls the image capturing element,
   wherein the light source control circuit and the image capturing element control circuit are electrically shielded from each other.

7. The drive assist device of claim 1, further comprising:
   a shield provided between the first lens and the second lens.

8. The drive assist device of claim 2, further comprising:
   a shield provided between the first lens and the third lens.

9. A vehicle, comprising:
   the drive assist device of claim 1, the drive assist device being configured to obtain detection information indicating surroundings of the vehicle in vehicle traveling direction; and
   a vehicle controller that controls operation of the vehicle based on the detection information.

\* \* \* \* \*